Patented Sept. 28, 1943.

2,330,631

UNITED STATES PATENT OFFICE 2,330,631

MANUFACTURING SULPHUROUS ANHY-
DRIDE, ALUMINA, AND CEMENTS USING
SULPHATES OF CALCIUM

Jean Charles Séailles, Paris, France; vested in the
Alien Property Custodian

No Drawing. Application November 21, 1939,
Serial No. 305,481. In Luxemburg November
24, 1938

4 Claims. (Cl. 106—103)

This invention relates to the production of sulphurous acid, alumina and cements starting from sulphates of calcium, and is particularly concerned with a method for making such products.

It is of considerable industrial interest to chemically combine materials such as sulphates of calcium which are rich both in sulphur and in lime, with raw-materials rich in alumina silicates or, more generally, materials containing alumina such as clays, bauxites or other suitable materials for such a combination when properly carried out permits of obtaining three kinds of important products of broad industrial and commercial use, viz. sulphurous anhydride easily transformable into sulphuric acid. alumina and cements such as Portland cements, alumina cements, sulpho-aluminate cements, iron ore cement.

It has hitherto been endeavoured to obtain sulphurous anhydride burning in an appropriate kiln a suitable mixture of said materials with a view to obtaining at the same time, in the course of one operation, a hydraulic product which may be utilized as cement. In practice, however, this operation gives rise to considerable difficulties in providing conditions which would permit of evolving sulphurous anhydride and at the same time obtaining a suitable cement, said difficulties resulting in adversely affecting the last mentioned product. Indeed, when a mixture of said materials is burnt for the purpose of producing sulphurous gas at the same time as obtaining a cement, the cement thus obtained will generally contain either an excess of sulphide of calcium or an excess of uncombined sulphate of lime or both in spite of the degree of accuracy with which the initial mixture has been proportioned and in spite of very careful burning. Both last mentioned chemical bodies are by themselves noxious to cements and, furthermore, alter the quota of combined lime as provided in the initial proportions of said mixture. In other terms, the cement thus obtained will be of irregular quality and the operation under consideration will prove to be disastrous because of the impossibility to commercialize a product of this nature having varying qualities: good, ordinary or inferior ones as they come out of the kiln.

The present invention aims to eliminate all such deficiencies inherent to the making of said products according to methods hitherto generally employed, and has for its principal object to provide a method and means according to which, in contradiction to making said products in the course of one single burning operation as hereto-fore, the process of making is divided into steps of forming first sulphurous anhydride and an intermediate burnt product, then utilising the intermediate product thus obtained to extract alumina therefrom by dissolving the product in water or liquids rich in water, then utilising the residue from such extraction, i. e. the body which has already yielded both sulphurous acid and alumina, to make, inter alia, hydraulic cements by burning said residue or body dressed with suitable completive materials added thereto in due proportion to permit of obtaining a final product having the required hydraulic properties. This result is always attainable owing to the fact that it is not necessary to take account for this second burning operation of any other, consideration than that of the obtainment of a cement of desired best quality. It is to be noted that the first burning operation generally involves no difficulties; its object is only to obtain sulphurous acid and aluminates of lime soluble in water; however, according to this invention, there is no need to lay great stress upon the degree of the solubility in water of the aluminates of lime thereby obtained, since any quantity thereof which may remain in the residue will subsequently be re-adjusted for the second burning operation in accordance with the desired quality of the cements to be obtained therefrom. In other words, it is immaterial if the intermediate product resulting from the first burning operation is mediocre or even bad, since after washing out a certain portion of its aluminates of lime it will be readjusted or dressed for the second burning operation, whilst a corresponding burnt product obtained according to manufacturing methods hitherto employed must always be of uniformly good quality throughout all respective burning operations; this, of course, renders the manufacturing highly precarious and in any way too costly and at length commercially prohibitive; hence, the importance of the method set forth by this invention.

In the making of the aforesaid products care is to be taken that the replacement of the lime or the limestone by sulphate of calcium and the burning of the respective mixtures be effected without involving the formation of insoluble ternary bodies instead of soluble mixtures of lime aluminates, or of other insoluble compounds. It is furthermore indispensable that the solubility of aluminates of lime formed in the course of the burning operation be not altered or destroyed through new impurities introduced by the calcium sulphates. Insoluble bodies might occur for example in the form of sulphoaluminates of calcium, or owing to the influence resulting from the introduction of a body much less decomposable than carbonate of lime, which is generally the case of sulphate of calcium. As to the modification in the solubility of obtained products, it has heretofore been assumed that, after the burning operation, the presence of sulphate of calcium ought to give rise to serious inconveniences, since sulphate of calcium is known to have very strong insolubilizing action on aluminates of lime.

In the course of his researches the applicant has found that all these different inconveniences do not arise when substituting, for the purpose of making aluminates of lime for extracting alumina by dissolution in water, sulphates of calcium for limestone or the lime, to obtain in addition to alumina, sulphurous acid, for making for example sulphuric acid, and a residual product having a value adaptable to different uses, such as the making of hydraulic cements.

As pointed out hereinbefore, the present invention aims to replace the method of one single burning operation as hitherto generally employed for making different products such as sulphurous acid and cements out of sulphates of calcium, by a novel method of stepped manufacturing consisting in, at first, burning a mixture of sulphate of calcium and materials rich in almina-silicates or in clay, or other suitable materials to obtain the evolution of sulphurous gas and an intermediate burnt product wherein silicic acid, alumina and other elements if any are combined with the lime of the sulphate of calcium, the sulphurous gas thus obtained being used for example for making sulphuric acid, then suitably grinding said intermediate product, subjecting the same to a suitable washing to wash out as much of aluminates of lime as possible, and separating the insoluble residue from the aqueous solution which is used for example for the extraction of alumina, then adding to said insoluble residue, necessary or useful completive materials, then burning the resulting mixture to obtain a clinker having required hydraulic properties, said clinker to be ground to an impalpable powder which will be the finished cement product.

In preparing the mixture of starting materials for the purpose of the first burning, that is, calcining operation care will be taken to provide therein such a proportion of calcium oxide or lime as to insure the obtainment of aluminates of lime soluble in water. When such materials are based on minerals rich in aluminium, such as bauxites, in which silicic acid is an accessory component, the proportions in the mixture with respect to CaO are generally as follows, taken in molecules: 2 CaO to 1 $SiO_2$, 1 CaO to 1 $Al_2O_3$, 2 CaO to 1 $Fe_2O_3$, 1 CaO to 1 $TiO_2$, preferably with an excess of CaO.

When such materials are based on alumina-silicates in which silicic acid is, on the contrary the essential and often dominating component, such as argillaceous earth, schists, mining residues, blast furnace slags, cinders, ashes from coal combustion and the like, the proportions in the mixture with respect to CaO will be as follows: from 1 to 2 CaO to 1 $Al_2O_3$, 2 CaO to 1 $SiO_2$, from 1 to 2 CaO to 1 $TiO_2$, 2 CaO to 1 $Fe_2O_3$, preferably with an excess of CaO.

It is to be noted, however, that the proportioning of materials for the preparation of said mixture may be effected within relatively large limits while maintaining the entire security of the operations under consideration, owing to the fact that obtaining high solubilities of aluminates of lime is not of great importance for the final obtainable results and that in the complete operating cycle a relative error or disproportioning will have but little influence on such results. Indeed, the final operative results consist in obtaining sulphurous acid, alumina and cement; however, a certain decrease in the quantity of dissolved aluminates of lime has no influence on the dominant products which in this case are sulphurous acid and cement; such a decrease affects only the quantity of obtained alumina but not the quality thereof, whilst the respective operation according to previous methods will become disastrous if the quality of the cement obtained is adversely affected.

This circumstance may best be evidenced from the following example embodying the invention, wherein is used a material consisting in colliery residual schists having the following analysis results:

|   | Per cent |
|---|---|
| $SiO_2$ | 33.6 |
| $Al_2O_3$ | 20.4 |
| $Fe_2O_3$ | 4.7 |
| CaO | 1.7 |
| MgO | 1.3 |
| Alkalies | 3.7 |
| Fuel and volatile matters | 34.6 |
|   | 100.00 |

About 1,000 kilos of this material are mixed with 2,000 kilos of sulphate of calcium supposed to be pure and anhydrous. After the burning operation, about 1,500 kilos of burnt product and 950 kilos of sulphurous gas are obtained, the latter yielding about 1,500 kilos of sulphuric acid. Said burnt product is water-washed and the aluminate of lime precipitated therefor will yield from 100 to 150 kilos of alumina depending upon the efficiency of dissolution. The residual product, suitably completed or made up and burnt again will furnish about 1650 kilos of cement. The balance of the complete operative cycle will be as follows, expressed for each product recovered as a percentage of total value of the whole production of the three products:

|   | Per cent of the total production value |
|---|---|
| 1500 kilos of $H_2SO_4$ | 51.0–51 |
| 1550 kilos Portland cement | 34.0–34 |
| 100 to 150 kilos of $Al_2O_3$ | 10.0–15 |
|   | 95.0–100 |

It is evident that a considerable variation of the solubility in water of the product resulting from the first burning operation and a subsequent considerable variation of the quantity of recuperated alumina involve but a very small variation (of the order of 5%) of the total value of the made products.

According to the invention, the starting materials to be treated are ground to a degree of fineness preferably somewhat higher than is used for ordinary cement making and are generally prepared so as to provide as homogeneous a mixture thereof as possible; a certain proportion of coal is preferably intimately admixed thereto to act as reducing agent; such coal may be that still remaining in sufficient quantity in colliery residual schists or the like when such schists are employed as starting material to be treated.

The burning operation according to the invention is effected preferably in the dry or half-dry way in any suitable kiln, but preferably in a rotary kiln such as usually employed in the cement making. When no coal has been added to the mixture, the burning operation must be effected so as to maintain the mixture long enough, preferably from 2 to 3 hours, in the kiln at a temperature of about 1250° centigrade to decompose a sufficient quantity of the sulphate of calcium employed, whereafter the temperature may be increased without any inconvenience and without risking fusion. The case occurring, the burning may be processed by fusion in a suitable furnace, such as an electric furnace, but this will be more expensive. On the other hand, coal admixed to the mixture (generally from 4 to 15%) contributes to the burning, because the decomposition of $CaSO_4$ is then accelerated owing to the reducing action of the coal, it then being sufficient to terminate the burning operation in an oxidizing atmosphere to prevent or limit the formation of sulphide of calcium.

The applicant has furthermore found that, contrary to what ought to be expected, the presence in the burnt product of residual sulphate of calcium, even in relatively high proportion, is without inconvenience and does not adversely affect the solubility of aluminates. This fact evidently greatly facilitates the operations under consideration resulting in a large margin of security in conducting the burning process and in adjusting the gaseous atmosphere in the kiln; the explanation of this very important fact resides probably in that the much overburnt sulphite of calcium is difficultly soluble and as such intervenes but insignificantly in forming insoluble hydrated sulpho-aluminate of lime.

On the other hand, the presence of sulphide of calcium involves no serious inconvenience, though it is preferable to avoid same. This is easy to accomplish for even if coal of reduction has been added to the mixture there is normally in the hot portion of the kiln an oxidizing atmosphere owing to the necessary quantity of air introduced thereinto in addition to the air of direct combustion to burn up in the rearward portion of the kiln said coal of reduction.

As stated hereinbefore, the residue obtained from the extraction of aluminates by water, when such residues are used for the making of cements, is suitably completed with necessary or useful materials added thereto and then calcined at suitable temperature into a clinker having required hydraulic properties. This is particularly advantageous in the application to residues from the productions obtained with materials rich in silicic acid and containing, after the first burning operation, an important quantity of silicate of lime. In the course of the second burning operation, the small quantities of sulphate of calcium uncombined during the first burning operation are destroyed, whereby cements of high qualities are advantageously obtained.

The production may just as well be taken up by starting from argillaceous earth, blast furnace slags, bauxites and the like. In the case of bauxites, the residue of extraction will often be rich enough in iron to be advantageously used as iron ore or mass of purification for absorbing sulphuretted hydrogen.

As an example embodying the invention, the applicant will now describe the manufacture of $SO_2$; water soluble aluminate of lime and Portland cement from coal mine washing residues known as "washberg" or similar coal mine residues.

Analyses of the coal residue and of the sulphate of calcium.

|  | Coal residue | Sulphate of calcium |
|---|---|---|
| $SiO_2$ | 34.00 | 1.40 |
| $Al_2O_3$ | 20.50 | 0.25 |
| $FeO_3$ | 4.70 | 0 10 |
| MgO | 1.00 | 0.20 |
| CaO | 1.50 | 33.70 |
| $SO_3$ | 1.00 | 42.00 |
| Alkalis | 3.70 | |
| Loss on ignition | [1] 33.60 | [2] 22.35 |
|  | 100.00 | 100.00 |

[1] Combustible.
[2] Combined water.

The raw materials were mixed in the proportion of 28 parts of coal residue and 72 parts of sulphate carefully crushed and ground and formed into a homogeneous dry paste with only 12% of free water.

The material was burnt into a rotary kiln at a maximum temperature of about 1400° Cent. and the combustion was so regulated that the gas escaping from the kiln contained only a very small proportion of oxygen, generally 0.1 to 0.3 per cent. This nearly neutral atmosphere was existing at the rearward of the kiln whilst oxydizing conditions prevailed in the red hot part where air and pulverized coal were injected.

The production of $SO_2$ was satisfactory.

The burnt clinker had the following analysis:

| | |
|---|---|
| $SiO_2$ | 24.00 |
| $Al_2O_3$ | 13.50 |
| $Fe_2O_3$ | 3.18 |
| CaO | 56.40 |
| MgO | 0.96 |
| $SO_3$ | 0.68 |
| Alkalis | 0.98 |
| S | 0.30 |
| | 100.00 |

In this example as elsewhere herein the alkali present during the calcining step which produces the clinker is substantially exclusively lime, as shown by the analysis of the clinker remaining after the calcination. This lime is derived practically entirely from the calcium sulfate initially used although in minor amount also from calcareous compounds that may be present in small proportion, ordinarily as an impurity if at all, in other raw materials used as, for example, in the coal residue, the analysis of which is tabulated above, or in the bauxite of analysis given below. Alkali metals that may occur as impurities in raw materials, as shown in the analysis of the coal residue, for example, are not present in substantial amount as compared to the proportion of lime compounds. The aluminate formed during the calcining is principally calcium aluminate since the alkali present is chiefly lime.

Leaching was carried out in conventional manner with water working in a closed circuit with an extractive efficiency of nearly 75% of the total alumina present in the clinker.

The water progressively accumulated a small amount of soluble element such as alkaline salts and may therefore be better described in this case as a liquid rich in water and in which water is an essential and active element.

The residue of the leaching operation contained:

| | |
|---|---|
| $SiO_2$ | 29.75 |
| $Al_2O_3$ | 4.04 |
| $Fe_2O_3$ | 3.90 |
| $CaO$ | 60.00 |
| $MgO$ | 1.18 |
| $SO_3$ | 0.83 |
| Alkalis | 0.30 |

This composition is corrected by proper addition specially of CaO in the form of limestone for instance to give a raw material perfectly suitable for Portland cement manufacture.

Another point is that the silica is already combined with CaO so that reburning may be very easily carried at a substantially lower temperature than the temperature usually necessary where free silica has to be combined.

Another example embodying this invention will be now given, wherein the starting material was a bauxite of the following analysis:

| | |
|---|---|
| $SiO_2$ | 6.52 |
| $Al_2O_3$ | 55.00 |
| $TiO_2$ | 2.03 |
| $Fe_2O_3$ | 21.75 |
| $CaO$ | 0.05 |
| $MgO$ | 1.17 |
| Loss on ignition | 13.48 |

This was mixed with the same sulphate of calcium as before.

The proportions were 34.1 parts of bauxite and 65.9 parts of sulphate with 5 parts of reduction coal. The grinding was carried to such an extent as to obtain a residue of 2 to 3% on the 4900 mesh sieve.

The burning was progressively carried up to 1350° C. in a rotary cement kiln and $SO_2$ was evolved in a satisfactory way.

The clinker analysis was:

| | |
|---|---|
| $SiO_2$ | 5.90 |
| $TiO_2+Al_2O_3$ | 36.70 |
| $Fe_2O_3$ | 14.05 |
| $CaO$ | 41.30 |
| $MgO$ | 0.74 |
| $SO_3$ | 1.00 |
| $S$ | 0.31 |

Leaching of the pulverized clinker was carried in a closed water circuit in known manner with an efficiency of nearly 80% of the total alumina in the clinker.

The residue analysis was:

| | |
|---|---|
| $SiO_2$ | 11.45 |
| $TiO_2+Al_2O_3$ | 16.70 |
| $Fe_2O_3$ | 27.25 |
| $CaO$ | 41.22 |
| $MgO$ | 1.27 |
| $SO_3$ | 1.91 |

This residue was found to be suitable after drying to be used as a valuable mass for the absorption of $H_2S$ in gas purifying operations.

The above examples are given so that the nature of the invention may be better understood but of course do not limit in any way the scope of the described process.

Of course, instead of gypsum any other suitable form of sulphate may be used and specially the natural anhydrous mineral known as anhydrite.

It is to be understood that the invention is not limited to the particular examples described, for modifications in details may be effected without departing from the spirit of the invention especially as defined in the appended claims.

What is claimed is:

1. The method which comprises forming an intimate mixture including calcium sulfate, clay containing alumina and silica, and titanium dioxide approximately in the proportions of 1 to 2 mols of calcium sulphate to 1 mol of alumina, 2 mols of calcium sulphate for 1 mol of silica, 1 to 2 mols of calcium sulphate for 1 mol of titanium dioxide, and 2 mols of calcium sulphate to 1 mol of ferric oxide, calcining the mixture to form a calcium silicate and a soluble aluminate, cooling the resulting product, and extracting the cooled product with water to dissolve out the aluminate, the calcium sulphate providing lime during the calcining and the lime so provided serving substantially exclusively as the alkali during the said calcining.

2. The method which comprises forming an intimate mixture including calcium sulphate, a material containing alumina, a material containing silica, and a finely divided carbonaceous fuel and reducing agent, calcining the mixture to form a calcium silicate and a soluble aluminate, cooling the resulting product, extracting the cooled product with water to dissolve out the aluminate, and calcining the residue from the extraction to form a cement, the calcium sulphate developing lime during the initial calcining operation and the lime so developed serving substantially exclusively as the source of alkali during calcining of the said mixture.

3. The method described in claim 2 which includes adding to the said residue a calcareous compound providing lime at calcining temperatures, before the said residue is subjected to calcination.

4. The method described in claim 1, a solid carbonaceous reducing agent being incorporated into the said intimate mixture, the said calcining being effected in a rotary kiln in an atmosphere that at the charging end of the kiln is substantially neutral as to oxidizing and reducing conditions and at the opposite firing end is strongly oxidizing, cooling and extracting the resulting material with water to dissolve water-soluble compounds and leave an insoluble residue, adding to the residue a calcareous compound providing lime at calcining temperatures, and calcining the resulting mixture at a clinker-producing temperature so that there is produced a cement clinker.

JEAN CHARLES SÉAILLES.